Patented Sept. 19, 1939

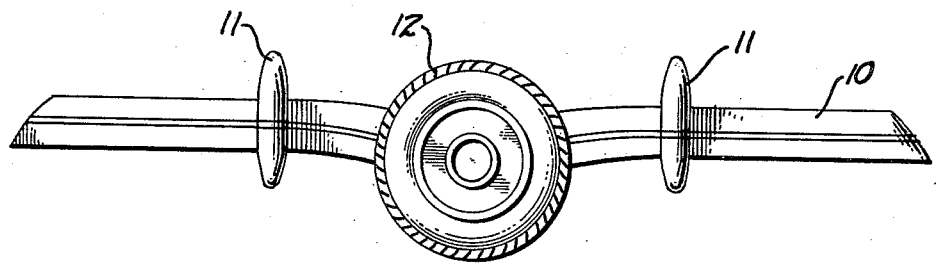
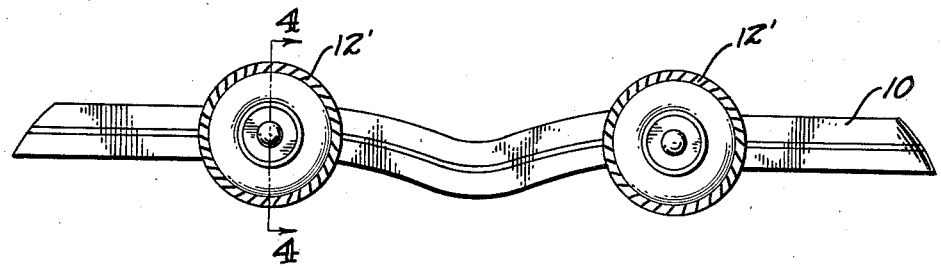
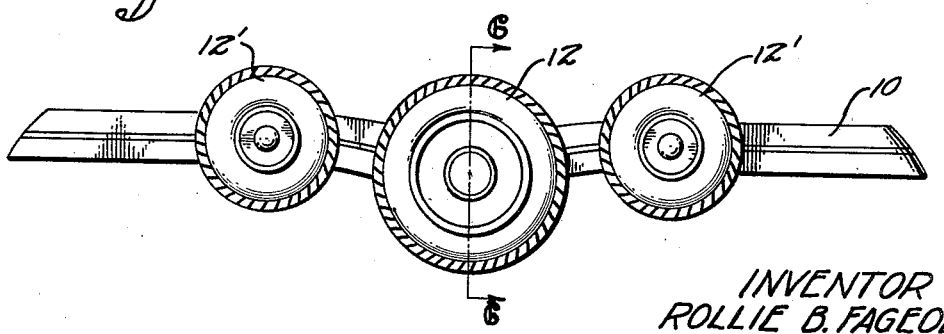

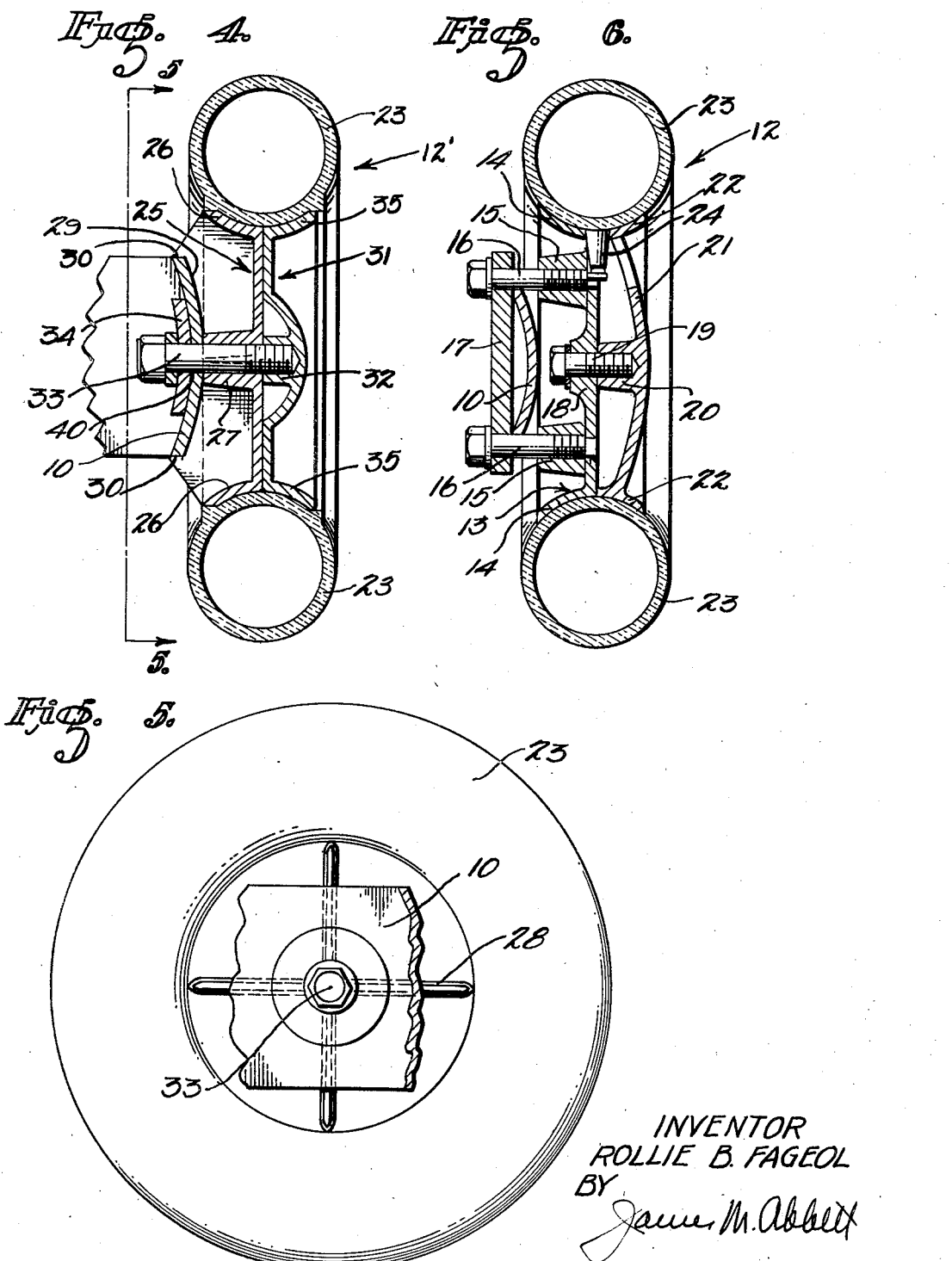

2,173,642

UNITED STATES PATENT OFFICE 2,173,642

NONHOOK, NONSKID BUMPER CONSTRUCTION

Rollie B. Fageol, Beverly Hills, Calif.

Application September 20, 1937, Serial No. 164,722

5 Claims. (Cl. 293—55)

This invention relates to automobile accessories, and particularly pertains to a non-hook, non-skid bumper construction.

At the present time, traffic congestion has made it imperative that automobiles be equipped with bumpers which are mounted on the front and rear thereof and which serve to reduce the damage caused by impact when a collision occurs. Due, however, to the relatively narrow vertical width of bumpers and the fact that bumpers on different cars and on the front and rear of different automobiles lie in different horizontal planes, it often occurs that in case of collision the bumpers on colliding cars do not coincide with each other in a common plane and for that reason, vertically disposed plates or guards are fastened across the face of the bumpers in horizontally spaced relationship to each other and in a manner to overhang the upper and lower edges of the main bumper bar for a sufficient distance to insure that the bumpers or guards on colliding cars will strike each other even though the bumper bars themselves are not aligned in the same horizontal plane. It has been found, however, that due to the resiliency of the wheels of the automobiles, their varying degrees of inflation, the resiliency of the vehicle springs and their varying degrees of deflection due to the load carried upon them, there is often a tendency for the ends of the bumper guard plates on one car to ride over or under the ends of the bumper guard plates on the car with which it collides. This results in an interlocking of the bumpers and may produce a collision of more serious consequences than would have been the case otherwise. It, at least, results in confusion in traffic while the bumpers of the automobiles are being disentangled.

It is the principal object of the present invention to provide attachments for automobile bumpers which will eliminate the tendency for the bumpers to hook together or to slide into a hooked position, and will at the same time provide guard elements to be carried by an automobile bumper and which elements will interpose a resilient cushioning body between the two bumpers in impact, the said structure being sightly in appearance, easy to install and tending to prevent interlocking of bumpers in collision.

The present invention contemplates the provision of a non-hook, non-skid structure to be mounted upon automobile bumpers at points intermediate the length thereof and which will act to lessen the impact shock, said structure including an annular cushion or pneumatic member provided with convenient mounting means by which it may be secured on to the face of an automobile bumper.

The invention is illustrated by way of example in the accompanying drawings, in which:

Figure 1 is a view in elevation showing one form of my invention as associated with an automobile bumper and utilizing a single central guard element particularly for protecting a radiator.

Fig. 2 is a view in elevation showing another form of my invention utilizing a pair of guard elements.

Fig. 3 is a view in elevation showing another form of my invention utilizing a central guard element and a pair of guard elements at opposite sides thereof of the type shown in Fig. 2.

Fig. 4 is a view in central vertical section through one of the guard elements as seen on line 4—4 of Fig. 2.

Fig. 5 is a view in rear elevation showing this guard element and the manner in which it is fitted against a bumper bar, a fragmentary portion of which is here shown.

Fig. 6 is a view showing another form of the invention in which the clamping means passes around a bumper bar and in through it, which view may be taken on line 6—6 of Fig. 3.

Referring more particularly to the drawings, 10 indicates an automobile bumper. This may be of any conventional design and includes a front impact bar extending transversely of the end of an automobile, said bumper being secured to the automobile frame in any suitable manner. The bumper, as here shown, has a downwardly bent portion occurring intermediate the ends of the bumper. The section of the bar, as indicated in Figs. 4 and 6 of the drawings, is convexed. It will be understood, however, that the type and design of a bumper is immaterial and that the invention is more particularly concerned with the non-hook and non-skid guard elements placed thereon.

In the form of the invention shown in Fig. 1 of the drawings, a pair of guard plates 11 of conventional design, are secured transversely of the bumper bar and overhang the upper and lower edges thereof. These plates are fastened in position by suitable means such, for example, as a bolt passing through an opening in the bar and clamping the plates in position. Disposed at the center of the bumper and against the outer face thereof is a guard structure 12 such, for example, as shown in Fig. 6 of the drawings. This structure comprises a wheel disk 13 terminating in a rim 14 of arcuate section. Formed on the back of the vertical portion of the disc 13 are a plurality of bosses 15 which are spaced from each other and are arranged in pairs to receive cap screws 16 which pass through fastening clips 17 and are threaded into the bosses 15. It will be seen that the cap screws extend along opposite edges of the bumper bar 10 and thus act to hold and position the structure upon the bumper bar so that when the cap screws are tightened, the guard structure will have a fixed relationship to the bumper. Formed centrally of the wheel disk 13 is a boss 18 through which a cap screw 19 is threaded into a threaded bore of a boss 20 carried centrally of a holding plate 21. This plate is here shown as being convexed on its outer surface and as being formed around its circumferential edge with a rim flange 22. This flange is arcuate in section and is concentrically arranged with relation to the rim 14 occurring on a wheel disk 13. The members 14 and 22 form a seat for a pneumatic tire or cushion element 23, which element is disposed in a circumscribed relation to the rim flange 14 and 22, and when clamped therebetween will be held against removal. The tire or cushioning element 23 may be a type of cushion structure or may be of the pneumatic tire type in which case a stem 24 is provided to permit it to be inflated. The diameter of the tire may be such as the fancy of the owner of the car dictates, for it is intended that these guard structures shall have utility and will at the same time provide "trim" for the car which will give it a more sightly appearance. When one guard is used, however, in the center of a bumper, it is for the purpose of protecting the radiator and is preferably of a large diameter.

Attention is directed to the fact that when a structure such as is shown in Fig. 6 is used, it is not necessary to drill holes through the bumper bar, which holes would reduce the strength of the bar.

Referring particularly to Figs. 4 and 5 of the drawings, another form of guard is shown which is especially adapted to be used to replace the guard plates 11 as shown in Figs. 2 and 3, and which guard plates are usually secured by a bolt passed through a hole in the bumper bar. This particular structure comprises a wheel disk 25 having an arcuate marginal flange rim 26 formed centrally of the disk. Projecting from the back of disc 25 is a boss 27. Emanating from this boss and extending radially at right angles to each other, are ribs 28 which project beyond the plane of the outer rear edge of the flange 26. In installing this type of guard upon a bumper, two of the ribs 28 are disposed vertically upon diametrically opposite sides of the center. This pair of ribs has an extending portion upon which an arcuate face 29 is milled, said face terminating in an upper and lower parallel shoulder 30. The arcuate face is designed to conform to the configuration of the front face of the bumper bar 10. The shoulders 30 are spaced apart to slip over the upper and lower edges of the bumper bar 10 and thus provide a seat for the disk structure 25 which will prevent it from rotating relative to the bumper bar when it is fastened thereon. Disposed in front of the wheel disk 25 is the fastening disk 31 which has a boss 32. This boss receives the threaded end of a cap screw 33 which passes through a back plate 34 and the bumper bar as well as the boss 17, upon the disk 25. The marginal edge of the fastening disk 31 is formed with an arcuate flange 35 which is complementary to the flange 26 on the wheel disk 25. These flanges receive a tire or other cushioning member 23 as previously described, and when the cap screw 33 is tightened in a tire structure, it will be held in an assembled position and will be properly disposed upon the bumper.

Fig. 2 of the drawings shows a pair of the structures, as disclosed in Figs. 4 and 5, applied to an automobile bumper in place of the bumper guard plates 11.

Fig. 3 of the drawings shows the installation of a central guard element of the type described in Fig. 6, and a pair of guard elements of the type shown in Fig. 4, in which adequate impact surface will be provided to protect the radiator and the front portion of the automobile while at the same time enhancing the appearance of the car.

When it is desired to apply additional protection for the body of the automobile over that now supplied by the bumper 10 with the guard plates 11, a structure 12 may be provided. This structure is usually of greater diameter than the overall vertical length of the guard plates, so that there will not be the opportunity for the colliding parts of another car to extend over the bumper and crush the radiator guard or core. In applying the type of radiator guards, as indicated by 12 in the drawings, the cap screws 16 are removed and the shackles 17 with the cap screws, are positioned at the rear of the bumper bar 10 with the two uppermost cap screws 16 extending over the upper lip of the bumper bar, and lowermost pair of cap screws extending beneath of the lower lip of the bar. These cap screws are then screwed into the bosses 15 to hold the structure in an assembled position on the bumper bar, without the necessity of drilling any holes through the bar.

Attention is called to the fact that the rear marginal face of the rim flange 14 is in a vertical plane offset inwardly from the plane of the rear face of the tire 23, thus when the cap screws 16 are tightened into position, they will cause the bumper bar, upon diametrically opposite sides of the tire 23, to engage the rear face of the tire and compress it. This will insure that the bumper bar will deflect a seat in the rear face of the tire, against which the front face of the bumper bar is rigidly held. This will prevent rattling and chattering of the metal parts with relation to each other, and will insure that the guard structure 12 will not produce objectionable noise against the bumper bar. When it is desired to inflate the tire 23, it may be inflated through the stem 24.

By reference to Fig. 6, it will be seen that the plane of the front face of the tire 23 is in advance of the convexed face of the member 21, so that in the event of impact with the guard structure 12, the tire or cushion member 23 will be struck first. This will tend to prolong the collision period and will thereby reduce the magnitude of collision force. If the force is sufficient, the tire element will be compressed until contact of the colliding object may be made with the member 21 or its flange 22, and since the outside diameter of the flange 22 is much greater than the vertical width of the bumper bar 10, the effect will be substantially the same as when a bumper bar collides with a guard plate of the type indicated as 11 in the drawings. There will be one material difference, however, and that is, that due to the cushioning action of the tire member 23, and the non-skidding character of the material of which the tire is made, the tire will tend to prevent vertical sliding motion of the colliding object with relation to the tire, and will thus prevent the object in impact from moving over the bumper to a hooked position.

In order to install the form of the invention shown in Fig. 4 and indicated at 12' in the drawings, the plates 11 are removed from the bumper, or if the bumper has not been thus equipped, a hole 40 is drilled through the plate to receive the bolt 33. The guard structure 12' may be drawn to a seated position against the bumper bar as shown in Fig. 4. The action of that particular type of guard will be the same as that previously described.

In collision, when the cars are equipped with the type of guards here shown, there will be interposed between the two bumpers, a relatively large and adequate cushioning surface of a resilient character which will materially reduce the damage otherwise created by the impact. It will also be noted that when the two sets of bumpers having the guards 12 or 12' collide, even though the bumpers are not in the same horizontal plane, the overhanging distance of the bumper guards 12 and 12' will be sufficient to insure that parts of the two bumper structures will always engage in collision. It will also be evident that the material of the members 12 and 12', which is preferably rubber, will increase the friction co-efficient between the parts so that a non-skidding action will be produced. This will also reduce the tendency for the bumper to move to a hooked position.

It will be recognized that the guards 12 and 12' are provided with a relatively large impact area, and a large air compression space within the tire 23, so that there will not be a tendency for the tire to be burst by the impact. If, however, a tire should be burst or damaged sufficiently to require its replacement, this may be accomplished quickly by unfastening the mounting, removing the element 23, and securing another one in place thereof.

It will thus be seen that the bumper guard structure here disclosed provides a non-hook and non-skidding guard element which increases the impact resistance quality of a bumper as well as more adequately insures that colliding bumpers will not become interlocked, the said structure being simple in design, easy to install and lending a sightly appearance to the car.

While I have shown the preferred form of my invention, as now known to me, it will be understood that various changes may be made in the combination, construction and arrangement of parts of the invention by those skilled in the art, without departing from the spirit of the invention as here shown.

What I claim and desire to secure by Letters Patent is:

1. A guard for automobile bumpers comprising a rear fitting having an annular rim of arcuate cross-section and being formed on its back face with a seat adapted to rest against the front face of the bumper, a front fitting having an annular rim of arcuate section complementary to the first mentioned rim, means for clamping the front fitting to the back fitting, means for clamping the back fitting to the bumper, and an annular pneumatic cushion member circumscribing the rims and seating upon the arcuate faces thereof, the diameter of said cushion member being greater than the combined overall width of the rim flanges, whereby the vertical plane of the face of the cushion member will be in advance of the vertical plane of the face of the front fitting.

2. In combination with the bumper bar of an automotive vehicle, a guard comprising a disc member adapted for connection to said bar so as to extend forwardly thereof, a plate member associated with said disc member, said members having complementary rims of arcuate cross-section, a miniature pneumatic tire mounted on said rims and extending in a plane parallel to said members, means for securing said disc member to said bumper bar, and means for securing said plate member to said disc member so as to hold said tire in position on said rims.

3. In combination with the bumper bar of an automotive vehicle, a guard comprising a disc member adapted for connection to said bar so as to extend forwardly thereof, a plate member associated with said disc member, said members having complementary rims of arcuate cross-section, an annular cushion element mounted on said rims and extending in a plane parallel to said members, bolt means for securing said disc member to said bumper bar, and bolt means for connecting said plate member to said disc member in a manner to hold said cushion element in position on said rims.

4. A combination as set forth in claim 2 in which the plane of the front face of the tire is in advance of the front face of the plate member.

5. In combination with a bumper bar of an automotive vehicle, a guard comprising a disc member adapted for connection to said bar so as to extend forwardly thereof, a plate member associated with said disc member, said disc member having a rim of arcuate cross-section, an annular cushion element mounted on said rim and extending in a plane parallel to the disc member, bolt means for securing said disc member to said bumper bar, and bolt means for connecting said plate member to said disc member.

ROLLIE B. FAGEOL.